United States Patent [19]

Morrison et al.

[11] 4,097,610
[45] Jun. 27, 1978

[54] PROCESS FOR MAKING FISHBAIT AND THE PRODUCT PRODUCED THEREBY

[76] Inventors: Ronald L. Morrison, 3719 NE. 74th Pl., Seattle, Wash. 98115; John W. Dawson, Box 880, Long Beach, Wash. 98631

[21] Appl. No.: 763,543

[22] Filed: Jan. 28, 1977

[51] Int. Cl.² ............................................. A23L 1/325
[52] U.S. Cl. ........................................................ 426/1
[58] Field of Search ............................ 426/1; 43/42.02

[56] References Cited

U.S. PATENT DOCUMENTS

| | | | |
|---|---|---|---|
| 1,384,320 | 7/1921 | Hickson et al. | 426/1 |
| 1,703,324 | 2/1929 | Sellen | 426/1 |

*Primary Examiner*—Raymond N. Jones
*Assistant Examiner*—R. A. Yoncoskie

[57] ABSTRACT

A process, and the product produced thereby, for making fishbait from commercially suitable and/or unsuitable salmon eggs. The process includes the steps of: (1) mixing the salmon eggs, any residual salmon egg material, and the residual salmon egg oil with a binder, such as sugar, to form a mixture which thus includes whole salmon eggs; (2) spreading the mixture into an open vessel; (3) swabbing the exposed surface of the mixture with oil; (4) heating the mixture in a vacuum, thereby cooking it into a soft, but congealed mass; (5) turning the congealed mass over and repeating steps (3) and (4); and (6) cutting the mass resulting from step (5) into strips convenient for packaging and sale.

9 Claims, 3 Drawing Figures

PROCESS FOR MAKING FISHBAIT AND THE PRODUCT PRODUCED THEREBY

BACKGROUND OF THE INVENTION

The present invention relates specifically to a process for making fishbait using fish eggs, particularly salmon eggs.

Fish eggs, particularly salmon eggs, have long been used for fishbait in a wide variety of fishing applications. Numerous processes have been developed to increase the useful life of salmon eggs, to enhance their appearance, to increase their attractiveness to the fish, and to alter their texture to make them easier to use.

Examples of these processes are found in several U.S. patents. Among them are U.S. Pat. Nos. 1,703,324, and 1,659,132, which disclose processes for enhancing the appearance or increasing the useful life of the eggs. Other patents, such as U.S. Pat. Nos. 2,743,185 and 2,951,761, disclose processes for hardening the egg, so that they are easier to place on a fishing hook and tend to remain on the hook longer than otherwise. Still others such as U.S. Pat. Nos. 3,876,803 and 3,931,414 disclose additional processes which use salmon eggs.

Disadvantages with existing salmon egg type fishbait do, however, remain. All too often, individual salmon eggs still fail to remain on a fishing hook for any length of time, to the frustration of the fisherman. Furthermore, several salmon eggs must frequently be used at once, in order that there be sufficient bait on the hook. The time the user must spend in baiting his hook is thus significantly increased, with a corresponding decrease in his fishing time.

Disadvantages with current processes exist also, especially in the waste of what are referred to as "commercially unsuitable" salmon eggs, i.e. those salmon eggs which are discarded because they are too soft, the wrong color, too old, or broken.

Accordingly, it is an object of the present invention to provide a process for making fishbait and the product produced thereby which permits use of commercially unsuitable fish eggs.

It is another object of the present invention to provide such a product which can be maintained for a substantial period of time without refrigeration.

It is a further object of the present invention to provide such a product which is in the form of a soft mass from which can conveniently be cut a portion which is in a size and shape selected by the user at the fishing site.

It is an additional object of the present invention to provide such a product which is in a form which may be conveniently packaged.

It is yet another object of the present invention to provide such a process which can be completed in several hours.

It is a still further object of the present invention to provide such a process which can be accomplished relatively inexpensively, without expensive or complicated equipment.

It is a still further object of the present invention to provide such a process which can be accomplished with unskilled labor.

SUMMARY OF THE INVENTION

A process, and the product produced thereby, is provided which uses fish eggs and a binder material. In the fishbait process, the fish eggs, at least some of which are whole, are mixed with the binder material to form a mixture of fish eggs in a slurry. The mixture is then spread to a desired depth in a container. The exposed surface of the mixture in the container is then brushed with oil, and the mixture is then heated until it forms a soft, pliable, congealed mass, with the whole eggs being firmly held in the solidified slurry. The congealed mass is the fishbait product. The fishbait product then may be cut into selected size strips for packaging for ultimate sale and/or use.

DESCRIPTION OF THE PREFERRED EMBODIMENT

Figure 1:
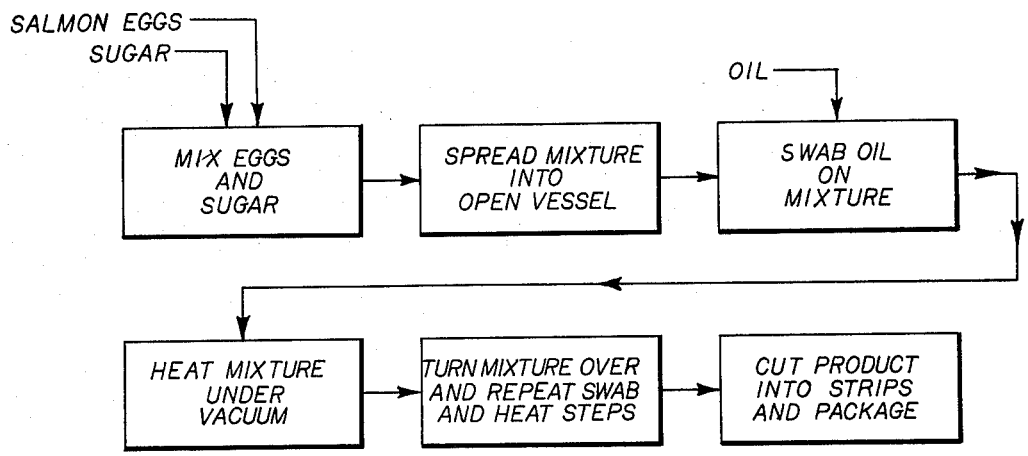
FIG. 1 is a flow diagram in block form showing the steps of the fishbait process of the present invention.

Referring to FIG. 1, the process of the present invention begins with salmon eggs and sugar. Although the process is useful with other kinds of fish eggs, salmon eggs are preferred. The salmon eggs may be either commercially suitable or commercially unsuitable or any combination of the two. Those salmon eggs which heretofore have been rejected because of their size, texture, color or their age can thus be used. In addition to the whole eggs, residual salmon egg oil and salmon egg residue is used. Residual salmon oil is the free salmon oil resulting from broken eggs or oil residue accompanying the eggs. Salmon egg residue is the residue of broken salmon eggs, blood, and whole or broken skeins, which are the sacs containing the eggs in the salmon. A substantially greater percentage of available salmon eggs and residual material is thus used to make fishbait by the present process than heretofore has been possible.

Some whole eggs must be present, in addition to the salmon egg oil and salmon egg residue since the oil contained in the whole egg is important in attracting fish. When one or more of the whole eggs are punctured by a fisherman when he baits his hook, the oil in the whole eggs is released and spreads in the water, attracting the fish to the bait.

The other part of the mixture is sugar, which in one embodiment is provided in a ratio of one pound to twenty-five pounds of salmon eggs. The sugar is thoroughly mixed with the residual salmon oil and the salmon egg residue to form a thick slurry binder in which the whole salmon eggs are randomly distributed. The ratio of sugar to eggs can vary substantially in the present process without harming the fishbait product. Ingredients other than sugar may be successfully used, but they must be capable of mixing with the residual salmon oil and the salmon egg residue to form a slurry binder for the whole eggs.

The slurry coats the whole eggs and fills in the space between adjacent whole eggs. The mixture of slurry binder and whole eggs is then poured into a container in preparation for cooking. In the embodiment shown and described, the container is a vessel open on one side. The mixture is spread to a depth of approximately ⅜ of an inch. This depth is a manner of convenience, however, and may be altered to fit particularly circumstances, i.e. a particular desired thickness of the fishbait product.

The exposed side of the mixture in the vessel is then swabbed with an inexpensive oil similar to that used by commercial canneries. A #3 white oil has been found to provide satisfactory results. The oil prevents formation of a crust on the surfaces of the mixture when it is heated.

After the exposed surface of the mixture has been brushed with oil, the vessel with the mixture is placed in a vacuum chamber and heated, thereby in effect cooking the mixture and removing most, if not all, of the water therefrom, leaving the whole salmon eggs in a congealed slurry binder. This heating step under a vacuum transforms the original mixture into a soft, pliable mass which does not need refrigeration and which is well suited for use as a fishbait.

The vacuum chamber is evacuated to a pressure of 27 inches of mercury and the termperature in the chamber is maintained between 85° and 95° F. The use of the vacuum chamber permits the heating step to be accomplished at a comparatively low temperature and relatively rapidly, with no crust formation on the exposed surface of the mixture.

With the above stated vacuum, temperatures above 95° will tend to produce unsatisfactory results, as crust begins to form on the exposed surfaces of the mixture during heating. The formation of a crust is undesirable because the resulting fishbait product is more difficult to work with, and its utility is impaired. Although temperatures lower than 85° have been successfully used, the process does take an increasingly longer time to complete.

Using an 85° to 95° temperature range in the vacuum chamber under 27 inches of mercury, the mixture is ready to be turned in 3-4 hours, after which the other surface (not exposed) is brushed with oil, and the mass placed back in the vacuum chamber and heated for another 3-4 hours under the same vacuum and temperature.

The heated vacuum chamber removes nearly all the water from the mixture under the above-stated conditions, and in effect cooks the slurry binder to a unitary congealed mass in which the whole salmon eggs are held in suspension. The resulting mass, which is the fishbait product, requires no refrigeration or vacuum sealing for preservation, and hence it may be conveniently stored for future sale or use.

Figure 2:
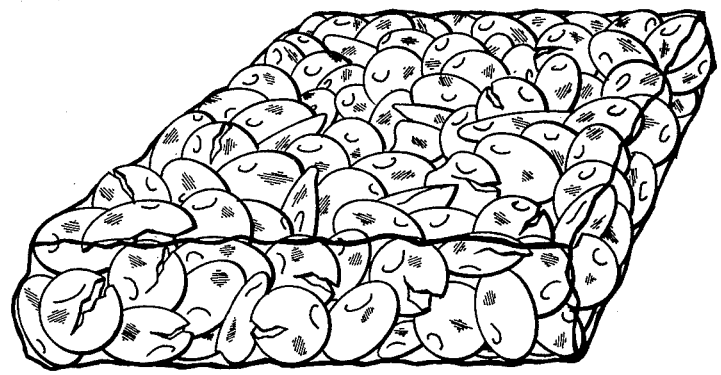
FIG. 2 is an isometric view of a portion of the fishbait product of the present invention.
Figure 3:
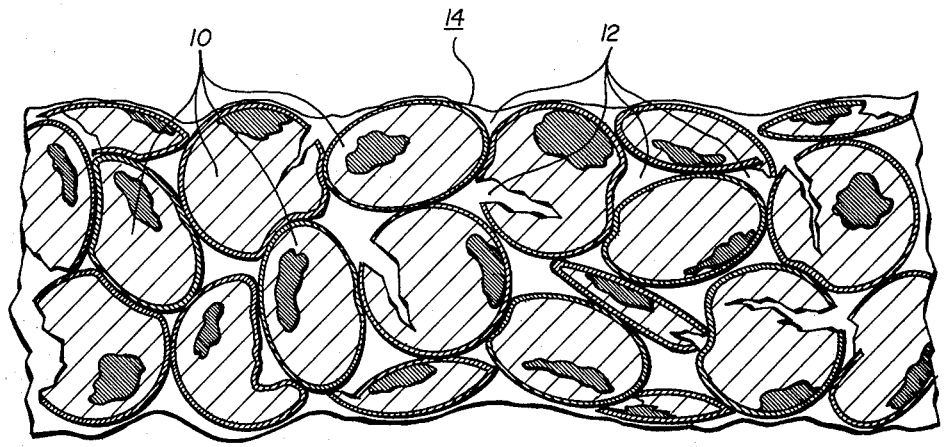
FIG. 3 is a cross-sectional view of a portion of the fishbait product of the present invention showing the relationship of the whole salmon eggs to the congealed slurry.

When the congealed mass of salmon eggs and slurry binder is removed from the vacuum chamber, it is soft and pliable, without a crust, yet is a unitary mass, and will not break apart easily. Whole salmon eggs remain in the fishbait product. FIGS. 2 and 3 show isometric and cross-sectional views, respectively, of a portion of the fishbait product. Whole salmon eggs 10—10 are held in suspension by the now solidified slurry binder 12. The exposed surfaces of the fishbait product, such as upper surface 14, are somewhat irregular, caused by the surface irregularlity of both the whole salmon eggs and the irregular physical relationship between adjacent whole eggs.

The fishbait product may be conveniently cut into selected size strips, and then packaged for future use. One convenient size is approximately 1½ by 4. The strips of fishbait product are inserted into a suitable container, such as a closeable, flat plastic bag, for sale or immediate use.

In a typical use of the fishbait product, the consumer will take one or more packages of the fishbait product with him to a fishing site, and then in the course of his fishing, will cut off pieces of selected size from the packaged strip. The ultimate user of the fishbait product thus has the freedom to select the size of his bait to match a particular application.

As the user punctures one or more of the whole eggs in the piece of fishbait product as he baits his hook, the salmon oil contained therein is released and spreads in the water. The presence of the oil in the water attracts the fish to the fishbait product.

It should be understood that various changes and modifications may be made to the embodiment described above without departing from the spirit of the invention. For instance, the heating step may be accomplished by slow, even heating without a vacuum chamber. The advantage of using the vacuum chamber is that the process can be completed quickly, and at low temperatures. The invention is defined by the claims which follow.

What is claimed is:

1. A process for making fishbait from fish eggs, comprising the steps of:
   (a) Mixing fish eggs, at least some of which are whole, with a slurry comprising a binder material, fish oil and fish egg residue to form a mixture;
   (b) Spreading said mixture into a container;
   (c) Brushing the exposed surface of the mixture in the container with oil; and
   (d) Heating said mixture until it forms a soft, pliable, congealed mass, with the whole fish eggs being held in the now-solidified slurry, said congealed mass forming the fishbait, which may be conveniently cut into bait size portions.

2. The process of claim 1, wherein said fish eggs are salmon eggs and wherein at least some of said salmon eggs are commercially unsuitable.

3. The process of claim 1, wherein said binder material is sugar.

4. The process of claim 1, wherein said heating step includes the step of placing said mixture into a vacuum chamber and heating said mixture under sufficient vacuum and temperature in order to form said congealed mass, which is characterized by an absence of crust on its exposed surface.

5. The process of claim 4, wherein the vacuum is approximately 27 inches of mercury and the temperature is in the range of 85° to 95° F.

6. A fishbait product produced by a process comprising the following steps:
   (a) Mixing fish eggs, at least some of which are whole, with a slurry comprising a binder material, fish oil and fish egg residue to form a mixture;
   (b) Spreading said mixture into a container;
   (c) Brushing the exposed surface of the mixture in the container with oil; and
   (d) Heating said mixture until it forms a soft, pliable, congealed mass, with the whole fish eggs being held in the now-solidified slurry, said congealed mass forming the fishbait.

7. A fishbait product comprising:
   a congealed mixture of whole salmon eggs in a solidified binder of residual salmon oil, sugar and salmon egg residue.

8. The product of claim 7, wherein said congealed mixture is soft, pliable, and convenient to cut, and wherein the exterior surfaces of the congealed mixture is characterized by an absence of crust.

9. The product of claim 8, wherein said sugar and said salmon eggs are provided in a ratio of approximately one pound of sugar to 25 pounds of salmon eggs.

* * * * *